United States Patent
Charney et al.

(10) Patent No.: US 9,202,467 B2
(45) Date of Patent: Dec. 1, 2015

(54) SYSTEM AND METHOD FOR VOICE ACTIVATING WEB PAGES

(75) Inventors: Michael L. Charney, Brooklyn, NY (US); Justin Starren, Hastings on Hudson, NY (US)

(73) Assignee: The Trustees of Columbia University in the City of New York, New York, NY (US)

(*) Notice: Subject to any disclaimer, the term of this patent is extended or adjusted under 35 U.S.C. 154(b) by 2631 days.

(21) Appl. No.: 10/863,577

(22) Filed: Jun. 7, 2004

(65) Prior Publication Data
US 2005/0143975 A1 Jun. 30, 2005

Related U.S. Application Data

(60) Provisional application No. 60/476,815, filed on Jun. 6, 2003.

(51) Int. Cl.
*G06F 17/27* (2006.01)
*G10L 21/00* (2013.01)
*G10L 15/26* (2006.01)
*G10L 15/193* (2013.01)

(52) U.S. Cl.
CPC ............. *G10L 15/26* (2013.01); *G10L 15/193* (2013.01)

(58) Field of Classification Search
CPC ..... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775; G06F 17/2795; G10L 15/18; G10L 2015/223; G10L 15/00

USPC .................. 704/270, 271, 275; 715/728–802; 345/1.1, 1.3; 709/246
See application file for complete search history.

(56) References Cited

U.S. PATENT DOCUMENTS 5,632,002 A * 5/1997 Hashimoto et al. ........... 704/231
5,819,220 A 10/1998 Sarukkai et al.
(Continued)

FOREIGN PATENT DOCUMENTS

EP 0854418 7/1998
JP 2003-036403 A 2/2003
(Continued)

OTHER PUBLICATIONS

Hemphill et al., Surfing the Web by Voice, 1995, ACM, International Multimedia Conference, pp. 1-12.*
(Continued)

*Primary Examiner* — Lamont Spooner
(74) *Attorney, Agent, or Firm* — Kenyon & Kenyon LLP

(57) ABSTRACT

A method for processing a voice request for data specifying a web page, the request including a rule-based grammar statement, the method comprising identifying a grammar associated with the rule-based grammar statement, determining whether a first connection identified as being associated with the grammar is specified in a data structure identifying one or more connections, and processing the request in at least a portion of a window capable of presenting the web page and associated with the first connection if a first connection identified as being associated with the grammar is specified in the data structure.

63 Claims, 2 Drawing Sheets

(56) References Cited

U.S. PATENT DOCUMENTS

| | | | |
|---|---|---|---|
| 5,960,399 A | 9/1999 | Barclay et al. | |
| 5,974,384 A * | 10/1999 | Yasuda | 704/275 |
| 6,088,675 A | 7/2000 | MacKenty et al. | |
| 6,101,472 A * | 8/2000 | Giangarra et al. | 704/275 |
| 6,115,686 A | 9/2000 | Chung et al. | |
| 6,177,936 B1 * | 1/2001 | Cragun | 715/760 |
| 6,233,559 B1 * | 5/2001 | Balakrishnan | 704/275 |
| 6,282,512 B1 * | 8/2001 | Hemphill | 704/270.1 |
| 6,313,854 B1 | 11/2001 | Gibson | |
| 6,385,583 B1 | 5/2002 | Ladd et al. | |
| 6,411,952 B1 | 6/2002 | Bharat et al. | |
| 6,418,439 B1 | 7/2002 | Papierniak et al. | |
| 6,433,795 B1 * | 8/2002 | MacNaughton et al. | 715/738 |
| 6,462,757 B1 * | 10/2002 | Kao et al. | 715/783 |
| 6,477,499 B1 * | 11/2002 | Yasuda | 704/275 |
| 6,532,444 B1 | 3/2003 | Weber et al. | |
| 6,564,186 B1 * | 5/2003 | Kiraly et al. | 704/260 |
| 6,587,822 B2 | 7/2003 | Brown et al. | |
| 6,604,075 B1 * | 8/2003 | Brown et al. | 704/270.1 |
| 6,604,077 B2 | 8/2003 | Dragosh et al. | |
| 6,636,246 B1 * | 10/2003 | Gallo et al. | 715/805 |
| 6,636,831 B1 * | 10/2003 | Profit et al. | 704/275 |
| 6,658,414 B2 | 12/2003 | Bryan et al. | |
| 6,718,308 B1 * | 4/2004 | Nolting | 704/275 |
| 6,954,896 B1 * | 10/2005 | Dodrill et al. | 715/234 |
| 6,965,864 B1 | 11/2005 | Thrift et al. | |
| 6,985,865 B1 * | 1/2006 | Packingham et al. | 704/275 |
| 7,013,435 B2 * | 3/2006 | Gallo et al. | 715/850 |
| 7,020,609 B2 | 3/2006 | Thrift et al. | |
| 7,032,169 B2 * | 4/2006 | Ativanichayaphong et al. | 715/201 |
| 7,036,080 B1 * | 4/2006 | James et al. | 715/728 |
| 7,065,712 B2 * | 6/2006 | Muto et al. | 715/760 |
| 7,260,530 B2 | 8/2007 | Werner et al. | |
| 7,324,633 B2 * | 1/2008 | Gao et al. | 379/88.18 |
| 7,334,050 B2 * | 2/2008 | Zondervan et al. | 709/246 |
| 7,366,766 B2 | 4/2008 | Kroeker et al. | |
| 7,426,467 B2 * | 9/2008 | Nashida et al. | 704/275 |
| 7,590,538 B2 * | 9/2009 | St. John | 704/246 |
| 2001/0034603 A1 * | 10/2001 | Thrift et al. | 704/270.1 |
| 2002/0010585 A1 * | 1/2002 | Gachie et al. | 704/270.1 |
| 2002/0010715 A1 | 1/2002 | Chinn et al. | |
| 2002/0032564 A1 | 3/2002 | Ehsani et al. | |
| 2002/0062216 A1 * | 5/2002 | Guenther et al. | 704/270.1 |
| 2002/0077823 A1 | 6/2002 | Fox et al. | |
| 2002/0178344 A1 | 11/2002 | Bourguet et al. | |
| 2003/0078973 A1 | 4/2003 | Przekop et al. | |
| 2003/0197723 A1 * | 10/2003 | Young et al. | 345/738 |
| 2004/0141597 A1 * | 7/2004 | Giacomelli | 379/88.17 |
| 2004/0153323 A1 * | 8/2004 | Charney et al. | 704/270.1 |
| 2007/0043574 A1 * | 2/2007 | Coffman et al. | 704/275 |
| 2007/0226640 A1 * | 9/2007 | Holbrook et al. | 715/765 |
| 2008/0098306 A1 * | 4/2008 | Gao et al. | 715/728 |

FOREIGN PATENT DOCUMENTS

| | | | | |
|---|---|---|---|---|
| WO | 99/48088 | | 9/1999 | |
| WO | WO 9948088 A1 * | | 9/1999 | G10L 9/06 |
| WO | 00/05643 | | 2/2000 | |
| WO | 00/05708 | | 2/2000 | |

OTHER PUBLICATIONS

Hemphill et al., Speech-Aware Multimedia, 1996, Multimedia IEEE, vol. 3 Issue 1, pp. 74-78.*

Frost, "Speechnet: a Network of Hyperlinked Speech-Accessible Objects," International Conference on Advance Issues of E-Commerce and Web-Based Information Systems, WECWIS, Apr. 8-9, 1999, pp. 116-121.

Charney et al., "Use of the Java Speech API for Development of an Automated Radiology Reporting System," American Medical Informatics Association Symposium, Nov. 6-10, 1999.

W3C "Grammar Representation Requirements for Voice Markup Languages," http://www.w3.org/tr/voice-grammar-reqs, Dec. 23, 1999.

Goose et al. "Enhancing Web Accessibility Via the Vox Portal and a Web-Hosted Dynamic HTML<-> VoxML Converter," Computer Networks, vol. 33, No. 1-6, Jun. 2000, pp. 583-592.

* cited by examiner

SYSTEM AND METHOD FOR VOICE ACTIVATING WEB PAGES

RELATED APPLICATIONS

This application claims priority to U.S. Provisional Application No. 60/476,815, titled SYSTEM AND METHOD FOR VOICE ACTIVATING WEB PAGES, filed Jun. 6, 2003, which is hereby incorporated herein by reference in its entirety.

This invention was made with government support under NSF Grant 11S9817434. The government has certain rights in the invention.

COPYRIGHT NOTICE

A portion of the disclosure of this patent document contains material which is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

This application is also related to the following pending patent applications; each of which is hereby incorporated herein by reference in its entirety:

Patent Cooperation Treaty International Application No. PCT/US01/45223, titled A METHOD AND SYSTEM FOR VOICE ACTIVATING WEB PAGES, filed Nov. 30, 2001, published Jun. 6, 2002 as International Publication No. WO/02/44887 A2; and U.S. Provisional Patent No. 60/250,809, titled A METHOD AND SYSTEM FOR VOICE ACTIVATING WEB PAGES, filed Dec. 1, 2000.

BACKGROUND OF THE INVENTION

The invention disclosed herein relates generally to voice activating web pages. More particularly, the present invention provides systems and methods for voice activating multiple windows containing web pages and complex web pages.

Over the past decade Automated Speech Recognition ("ASR") systems have progressed to the point where a high degree of recognition accuracy may be obtained by ASR systems installed on moderately priced personal computers and workstations. This has led to a rise in the number of ASR systems available for consumer and industry applications.

ASR systems rely on voice grammars to recognize vocal commands input via a microphone and act on those commands. Voice grammars fall into two categories: rule-based grammars and free speech grammars. Rule-based grammars allow the recognition of a limited set of predefined phrases. Each rule-based grammar, is invoked, if an utterance causes an event or set of events to occur. A rule-based grammar is invoked if an utterance, input via a microphone, matches a speech template corresponding to a phrase stored within the set of predefined phrases. For example the user may say "save file" while editing a document in a word processing program to invoke the save command.

On the other hand, free speech grammars recognize large sets of words in a given domain such as Business English. These grammars are generally used for dictation applications. Some examples of these systems are Dragon Naturally Speaking and IBM ViaVoice 7 Millennium. ASR systems have also incorporated text to speech ("TTS") capabilities which enable ASR systems to speak graphically rendered text using a synthesized voice. For example, an ASR system can read a highlighted paragraph within a word processor aloud through speakers.

ASR systems have been integrated with web browsers to create voice-enabled web browsers. Voice-enabled web browsers allow the user to navigate the Internet by using voice commands which invoke rule-based grammars. Some of the voice commands used by these browsers include utterances that cause the software to execute traditional commands used by web browsers. For example if the user says "home" into a microphone, a voice enabled browser would execute the same routines that the voice-enabled web browser would execute if a user clicked on the "home" button of the voice-enabled web browser.

In addition, some voice-enabled web browsers create rule-based grammars based on web page content. As a web page is downloaded and displayed some voice enabled web browsers create rule-based grammars based on the links contained within the web page. For example, if web page displayed a link "company home," such a voice enabled web browser would create a rule-based grammar, effective while the web page is displayed, such that if a user uttered the phrase "company home" into a microphone the voice enabled web browser would display the web page associated with the link. One shortcoming of this approach is that the rules generated from web page content are fixed over long periods of time because web pages are not redesigned often. Additionally, the rule-based grammars are generated from web page content, which is primarily intended for visual display. In effect these systems limit the user to saying what appears on the screen.

Web pages can also incorporate audio elements, which cause sound to be output. Currently web pages can incorporate audio elements into their web pages in two ways. The first way to incorporate an audio element is to use audio wave file content to provide a human sounding voice to a web page. Using audio wave files allows the web page designer to design the visual and audio portions of the web page independently, but this freedom and added functionality comes at a high price. The bandwidth required to transfer binary sound files over the Internet to the end user is extremely large.

The second way to incorporate an audio element is to leverage the functionality of an ASR system. Voice enabled web browsers may utilize the TTS functionality of an ASR system in such a way as to have the computer "speak" the content of a web page. Using this approach causes the bandwidth needed to view the page with or without the audio element be approximately the same but limits the subject matter of what the web browser can speak to the content of the web page.

Voice XML (VXML) affords a web page designer with another option. VXML allows a user to navigate a web site solely through the use of audio commands typically used over the phone. VXML requires that a TTS translator read a web page to a user by translating the visual web page to an audio expression of the web page. The user navigates the web by speaking the links the user wants to follow. With this approach a user can navigate the Internet by using only the user's voice, but the audio content is typically generated from web page content that is primarily designed for visual interpretation; and the visual interface is removed from the user's experience.

Thus, the inventors addressed the need to independently create an audio component of a web page that does not demand a large amount of transmission bandwidth and exists in conjunction with the visual component of a web page by inventing the system further described in Patent Cooperation Treaty International Application No. PCT/US01/45223, which is hereby incorporated herein by reference in its entirety. The '45223 application discloses systems and methods for, among other things, activating voice content in a single, simple visual web page.

The system of the '45223 application controls speech content within a web page via a proxy server that has access to the same computer device (or sound output channels of this device) as the browser. The proxy server examines data for speech content while at the same time feeding all other requested data to the browser. In the case where a user clicks on a link, data requested by the browser, specified by a URL, is passed through proxy server to the specified web server. The requested material from the web server is passed back to the browser.

In the case where a new URL is requested by the user via a speech event however, the proxy server requests this data (e.g.—executing a specified program or other command on the web server)] from the specified Web Server via the browser. Thus, the resultant data needs to be "pushed" back to the browser. This is accomplished via the use of the multipart/x-mixed-replace mime type further described in the '45223 application. This type causes the browser to hold open the connection between the browser and the proxy server, and to continue accepting data until a given signal or other token is sent or the connection is closed. For example, termination may occur because of a new "click" requested from the browser or because there is no speech content in the new page. The circumstances for termination are further described in the truth tables as shown in FIG. 3B of the '45223 application and further described therein.

The inventors have identified additional improvements, further described herein, including how to extend the system to work with web pages that contain complex, aggregate content or content from multiple pages operating simultaneously, for example in multiple instances or windows of a given browser, or in multiple frames within a given window.

SUMMARY OF THE INVENTION

The present invention, among other things, addresses the problems discussed above regarding voice activating web pages.

In one embodiment, the system includes a method for processing a voice request for data specifying a web page, the request including a rule-based grammar statement, the method comprising: identifying a grammar associated with the rule-based grammar statement; determining whether a first connection identified as being associated with the grammar is specified in a data structure identifying one or more connections; and processing the request in at least a portion of a window capable of presenting the web page and associated with the first connection if a first connection identified as being associated with the grammar is specified in the data structure. In some embodiments, the request comprises a request including a rule-based grammar statement having a phrase portion, a command portion, and a tag portion.

In some embodiments, the system processes the request in at least a portion of a new window capable of presenting the web page and associated with a second connection if a first connection identified as being associated with the grammar is not specified in the data structure. The second connection is added to the data structure and associated with the grammar. In some embodiments, the new window is also associated with the connection. The system also includes methods for removing identification of a connection from the data structure if a window associated with that connection is closed.

In some embodiments, the new window comprises a last window loaded by a computing device associated with the second connection, an active window at a computing device associated with the second connection, or is selected according to a user preference. In some embodiments, the grammar is a grammar associated with a last window loaded by a computing device associated with a connection, a grammar associated with an active window at a computing device associated with a connection, or is selected according to a user preference. The window may include a browser window or a portion of a window such as a frame.

In some embodiments, the request comprises a request for complex data, such as a request for complex data embedded in a web page. In some embodiments, the system examines a header or a footer associated with the request to determine a type of data requested, for example a header or a footer specifying a mime type. In some embodiments, the system examines a filename or a file extension associated with the request to determine a type of data requested.

In some embodiments, the system includes a method for processing a voice request for data specifying a web page, the method comprising: receiving, from a connection, data specifying a web page, the data including a rule-based grammar statement having a phrase portion, a command portion, and a tag portion; determining whether the connection is specified in a data structure identifying one or more connections; selecting a grammar associated with the connection from a data structure identifying one or more grammars; and processing the rule-based grammar statement using the selected grammar in at least a portion of a first window capable of presenting the web page and associated with the connection if the connection is specified in the data structure identifying one or more connections.

In some embodiments, the system selects a new grammar associated with the connection from a data structure specifying one or more grammars and processes the rule-based grammar statement using the selected grammar in at least a portion of a new window associated with the connection if the connection is not specified in the data structure specifying one or more connections. In some embodiments, the system also adds the connection to the data structure specifying one or more connections and associates the connection with the new grammar in the data structure specifying one or more grammars.

In some embodiments, the system includes a method for processing a voice request for data specifying a web page, the method comprising: receiving a request for data specifying a web page, the request including a rule-based grammar statement having a phrase portion, a command portion, and a tag portion; determining whether a window is associated with the request; and processing the request in at least a portion of the window associated with the request if a window is associated with the request.

In some embodiments, the system processes the rule-based grammar statement in at least a portion of a new window if a window is not associated with the request. In some embodiments, the system identifies a connection associated with the request and associates the connection with the new window.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION

Figure 1:
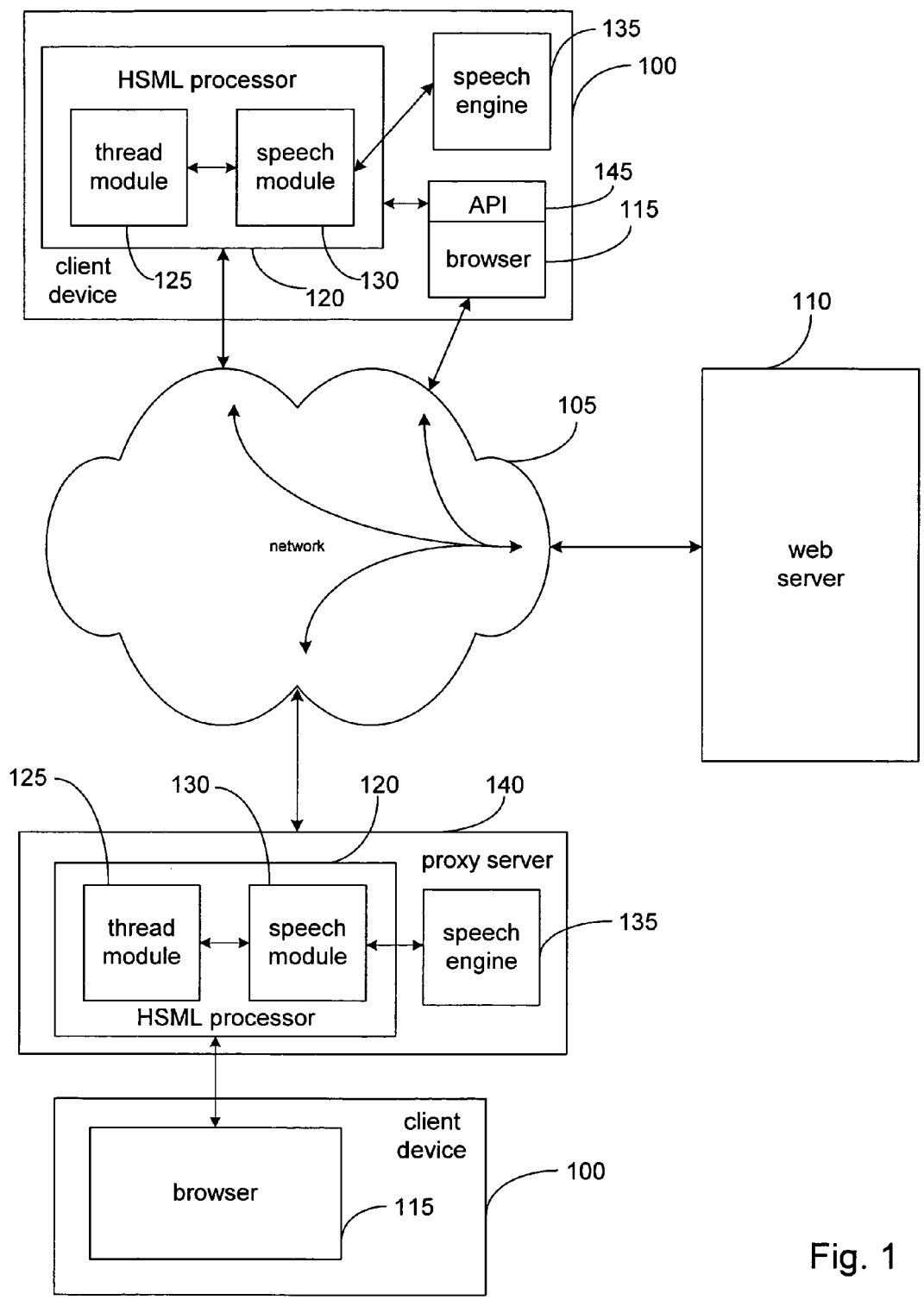
FIG. 1 is a block diagram of a network architecture for a system to perform voice activation of web pages according to an embodiment of the invention.

With reference to FIG. 1 embodiments of the invention are presented. FIG. 1 presents a block diagram of a network architecture for a system to perform voice activation of web pages according to an embodiment of the invention. As shown, the system includes one or more client devices 100 connected to a network 105, a web server 110, a browser 115, a hyper-speech markup language ("HSML") processor 120, a thread module 125, a speech module 130, a speech engine 135, a proxy server 140, and a browser application program interface ("API") 145.

A client device 100 may include, for example, a client computer, a cellular telephone, a personal digital assistant ("PDA"), a tablet PC, and other similar electronic devices equipped with a processor and capable of supporting a browser 115 software module as further described herein and in the '45223 application. Client devices 100 are communicatively coupled to a web server 110 or other similar server via a network 105. For example, in one embodiment, client devices 100 might be connected to a web server 110 via the Internet, a local area network, a wide area network, a wireless network, or other similar network or combination thereof.

Client devices 100 execute a browser 115, such as a web browser, generally configured to receive hypertext markup language ("HTML") pages and other data files from the web server 110, as well as associated audiovisual files and other types files known in the art. For example, in some embodiments, client devices execute the Internet Explorer browser, the Netscape browser, the Opera browser, and other similar browsers.

The browser 115 is also communicatively coupled to a hyperspeech markup language ("HSML") processor 120 as further described herein and in the '45233 application. The HSML processor 120 contains software modules, data structures, and other program code generally configured to process and present web pages containing HSML data, HTML data, and other associated data such as audiovisual data in the browser 115 as further described herein and in the '45233 application.

In some embodiments, the HSML processor 120 includes a thread module 125 and a speech module 130. The thread module 125 contains additional software modules, data structures, and other program code generally directed to handling threads and examining data content that passes between the browser 115 and the web server 110 and other devices connected to the network. The thread module 125 is communicatively coupled with the speech module 130.

The speech module 130 contains additional software modules, data structures, and other program code generally directed to coordinating communications between the HSML processor 120 and the speech engine 135. For example, the speech module 130 might coordinate communications between the HSML processor 120 and a speech engine 135 such as Dragon Naturally Speaking, IBM ViaVoice, or another speech engine known in the art. In some embodiments, the speech module 130 is communicatively coupled to the speech engine 135 and passes HSML data and other data to the speech engine 135 for processing. In some embodiments, the speech engine 135 passes HSML tag data or other data indicating that the speech module 130 should activate new page processing functionality or routines to process a new page. The speech module 140 then returns the address of the new page from the speech engine 135 to the thread module 125 to be communicated to the browser 115, to the web server 110, or to other computing devices connected to the network. In some embodiments, the speech module 130 processes pages loading new speech data derived from HSML data or other data into the speech engine 135 and directs the loading of new grammars and other information into the speech engine 135.

The speech module 130 also coordinates communications between the speech engine 135 and the thread module 125. For example, the speech engine 135 might pass HSML tag data or other data indicating that a new page should be passed to speech module 130 the for processing. The speech module 130 would then return the address of the new page from the speech engine 135 to the thread module 125 to be communicated to the browser 115, to the web server 110, or to some other device connected to the network.

In some embodiments, the HSML processor 120 resides and executes on a proxy server 140 as shown in FIG. 1. In other embodiments, the HSML processor 120 resides and executes on the same device as the browser or is otherwise communicatively coupled to the browser, and merely functions like a proxy server as further described in the '45223 application. In either of these two preceding embodiments, communications between the web server 110 and the browser 115 thus pass through the HSML processor 120 and are not direct. In some embodiments, the HSML processor 120 uses the multipart/x-mixed-replace mime type to maintain an open connection between the browser 115 and the HSML processor 120 or proxy server 140, and to push data to the browser as further described herein and in the '45223 application.

For example, in some embodiments, the system is implemented in a connectionless manner and maintains addresses, such as per-window addresses, to track requests associated with windows. A service in a window, such as an applet, accepts requests (e.g. to update itself, etc.). A process, for example a proxy server 140, or other process on the client side determines the window to which content should be directed and handles communications with the speech engine 135.

In other embodiments, the HSML processor 120 resides on the same device as the browser 115 (or is otherwise communicatively coupled with the browser 115) wherein the HSML processor 120 communicates with the browser via an API 145, and the HSML processor 120 and the browser 115 both communicate directly with the web server 110. For example, the browser might contain a plug-in or other similar API directed to communications with the HSML processor 120 and capable of passing or executing commands, program instructions, and other data between the HSML processor 120 and the browser 115. Thus, in some embodiments, the browser 115 might receive a web page with HSML data from the web server 110 and use the API 145 to pass the HSML data and associated instructions to the HSML processor 120 for processing as further described herein.

In some embodiments, the system includes programming, for example an applet in browser 115, which functions without a separate proxy server 140. For example, an applet may communicate directly with speech engine 135, with web servers, with the browser, with other applets, or with other network elements to coordinate page HSML data and other types of data loading. Thus, a distributional model is presented in which applets negotiate with each other regarding which applet has the focus or active grammar, how to resolve rule conflicts, etc. In some embodiments, data structures to support this functionality are maintained in browser memory or passed between applets via communication methods known in the art.

Figure 2:
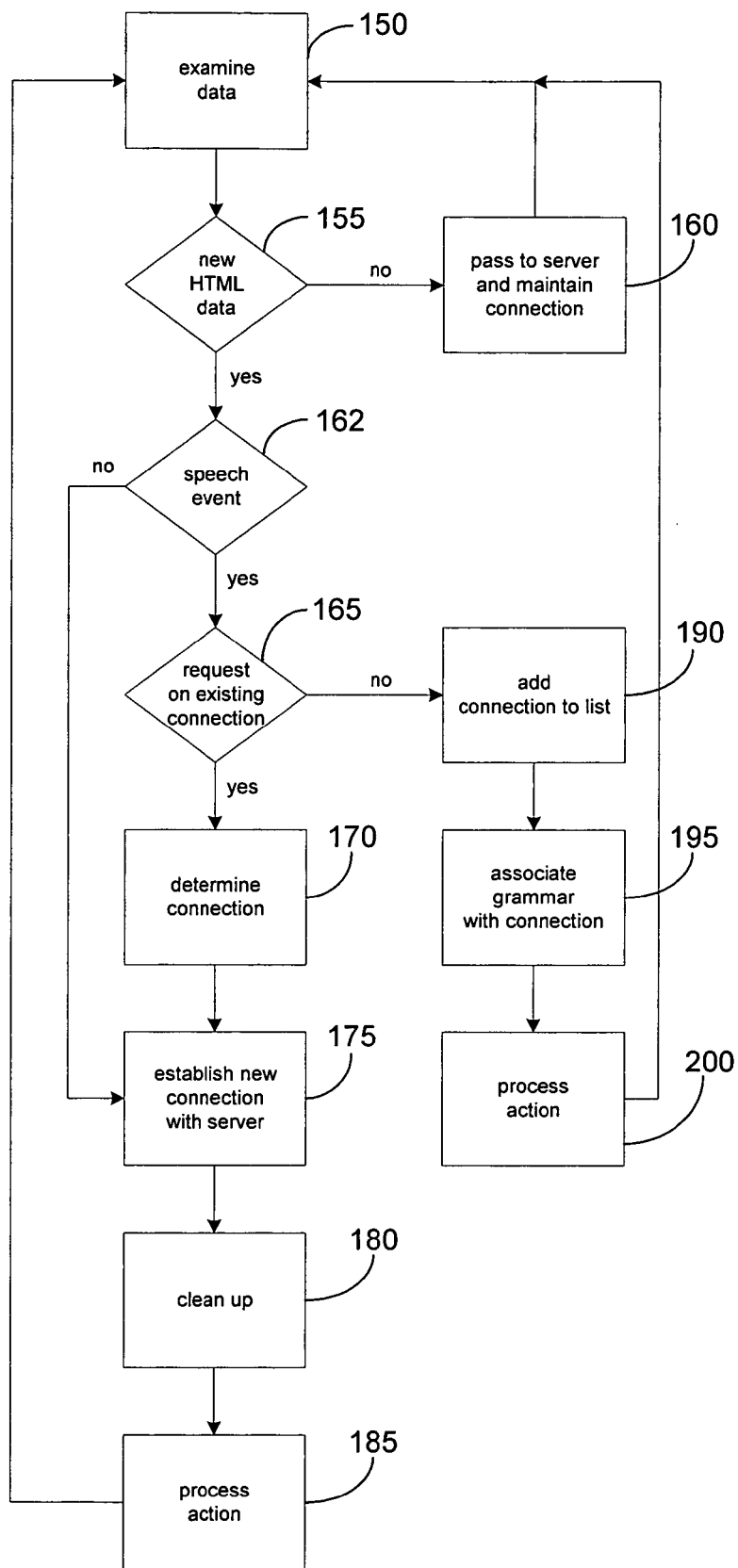
FIG. 2 is a flow diagram of a method to perform voice activation of web pages according to an embodiment of the invention.

FIG. 2 presents a flow diagram of a method to perform voice activation of web pages according to an embodiment of the invention. The system examines data passing between the browser 115 and the web server 110 or other server, step 150. For example, in some embodiments, the browser 115 processes an HTML document or other document comprising a complex window, such as a window with embedded data. For example, the browser 115 may process a document containing text, graphics, and other page assets known in the art.

The binary file for an asset such as a graphic is generally not passed to the browser 115 with the document, but is instead referenced via an image tag or other similar markup tag containing a link, such as a uniform resource locator ("URL") link, to the binary file containing the asset. The browser 115 then parses the image tag containing the link and uses the link to request the binary file for the asset from the web server 110.

Alternatively, the browser 115 may pass an HTML request or other request for data, for example a request specifying a new page, to the web server 110. Thus, the request from the browser 115 to the web server 110 generally contains a mime type indicating whether the request is for an asset of the current page such as an image file, an audio file, or other similar asset, or whether the request is an HTML request. The system examines the data since only HTML requests and other similar requests may pertain to the HSML functionality of the system as further described in the '45223 application.

In embodiments where the HSML processor 120 is a component of or generally functions as a proxy server 140, the system holds open the connection between the browser 115 and the HSML processor 120 using the multipart/x-mixed-replace mime type as described in the '45223 application while simultaneously accepting requests for and examining aggregate data embedded within the current page. In other embodiments, the HSML processor 120 interacts with an API 145 of the browser 115 to voice enable web pages. For example, the API 145 examines data to determine whether data comprises speech events which should be passed to the HSML processor 120 for processing (along with information regarding the window or frame associated with the data) or whether data comprises complex data to be handled by the browser as further described herein and in the '45223 application. The HSML processor 120 also processes speech events and communicate the results to the browser 115 via the API 145.

Thus, the system examines the request from the browser 115 to the web server 110 to determine whether the requests are requests for aggregate or complex data embedded with the current page or HTML requests for new data, step 155. In some embodiments, the system examines a header, a footer, or other data associated with the request specifying a mime type or other information to determine the type of request. For example, the request header mime type may indicate that a file is a JPEG file and thus the system determines that the request is a request for complex data and not a new HTML request. In some embodiments, request headers, footers, or other data associated with the request do not specify a mime type or other information corresponding to the data requested. In these cases, the system determines the type of data content requested by examining the filename and file extension associated with a request. Thus, if the request header for a file "picture.gif" did not specify a mime type, the system would try to guess whether the request was for complex data or new HTML data by examining the filename "picture.gif" to correlate the file extension ".gif" with a list or other data structure of known file extensions that are likely to contain complex data rather than new HTML requests.

If the request is not an HTML request or other request for new data, for example a request for a new page or a new window, the data is passed directly through to the server from either the browser (in the case of an API 145 being present) or the HSML processor 120 functioning similar to a normal proxy server known in the art, step 160. In embodiments where the HSML processor is functioning like a proxy server, the "master" connection, the one that specified the multipart/x-mixed-replace mime type to the browser, is maintained throughout this process while all data for the given page is requested.

If, however, the request is for new HTML (or text) data, the data is considered a new request from the browser 115, and the system determines whether or not the request was originating by a speech event, step 162. If the event was not originated by a speech event, for example, if the event was originated by a user mouse-click or by a user typing a URL into the browser 115 directly, then the system will process the event as an ordinary HTML request for new data as known in the art and control will pass to block 175.

In some embodiments, the system detects activity associated with a connection, for example a request for a new page that does not contain HSML data or a page closing, and performs a cleanup operation as further described in the '45223 application. For example, the system performs a clean-up operation terminating the old connection with the browser and also generally deletes the previous grammar associated with that connection.

If the request for new HTML (or text) data was originated by a speech event, the system determines whether the request came from an existing connection or from a new browser connection, step 165. For example, in one embodiment, the system receives a request from a connection, such as data specifying a web page, the data including a rule-based grammar statement having a phrase portion, a command portion, and a tag portion. In some embodiments, the HSML processor 120 and the browser 115 communicate via the API 145 to evaluate requests for new HTML data. In some embodiments, the system uses data structures, functions, processes and other methods further described in the "Java Speech Grammar Format Specification" available at http://java.sun.com/products/java-media/speech/forDevelopers/JSGF/JSGF-.html#11803 and hereby incorporated herein by reference in its entirety. In other embodiments, the system contains a connection manager or other software module or software object directed to managing associations between open or existing connections or sockets and their associated grammars. For example, a user might have several browser 115 windows open or a browser 115 window with multiple frames open. Each of these windows or frames is associated with an open connection (via the multipart/x-mixed-replace mime type server push method or other similar methods) and an associated speech grammar as further described in the '45223 application. Thus, the connection manager, among other things, examines requests for new HTML data to determine whether the requests come from an existing connection or a new connection.

In some embodiments, the connection manager generally comprises a software object that includes two sets of lists or other data structures, functions to add or delete items from the lists, and functions to recomputed itself and the corresponding lists as a hash. The two lists include a first list tracking associations between open or existing connections or sockets to windows or frames and grammars associates with windows or frames, and a second list tracking associations between speech rules and grammars associates with speech rules. In some embodiments, a connection may include a thread, for example where processing occurs in a multi-threaded environments at a client. Exemplary data structures for these lists according to one embodiment of the invention are appended hereto as Appendix A. In some embodiments, the connection manager comprises a software module or software object associated with the thread module 125 or the API 145. In other embodiments, the connection manager comprises an independent software module or software object.

If a request comes from an open or existing connection, the connection manager examines the speech rule contained in or associated with the request, and performs a lookup against its lists to determine the grammar and connection associated with the request, step 170. In some embodiments, a new connection is established between the browser 115 and the web server 110 or the proxy server 140, step 175. In some embodiments, the new connection with the proxy server 140 is added to the connection list or other similar data structure maintained by the connection manager. In some embodiments, the system also tracks connections between the proxy server 140 and the web server 110 or the browser 115, for example to address threading simultaneous requests or for other purposes.

The system also evaluates incoming data pertaining to the new connection to determine if there is a new grammar associated with the new connection. If a new grammar is associated with the connection, the grammar and any speech rules associated with it are loaded and also added to the appropriate connection manager lists as previously described herein. As further described in the '45223 application, the system generally performs a clean-up operation and terminates the old connection between the browser and the HSML processor 120, and also generally deletes the previous grammar associated with that connection, step 180. The request or other action is processed in or otherwise directed to the window or frame corresponding to the new connection, step 180. Thus, data is fed back to the window associated with the speech request or other request.

In some embodiments, if the request for new HTML data (or text) described in step 165 is not associated with an open or existing connection or socket, the connection manager adds the new connection to its list of connections, step 190. The connection manager also adds any grammar and speech rules associated with that connection to its lists as previously described herein, step 195. The system processes the action on the window corresponding to the connection, step 200, control returns to block 150, and the system continues processing data as further described herein and in the '45223 application.

In some embodiments, each of the multiple open windows or frames may have an active associated grammar. In some embodiments, the system must decide how to process a conflict for a speech event that is contained in multiple active grammars by determining which of the open windows or frames corresponds to the speech event. For example, two open windows or frames might contain code associated with the speech event "return to home page". Upon processing the speech event or directive indicating "return to home page", the system must determine which of the open windows or frames should be returned to its home page.

In some embodiments, when such a conflict is detected, the system displays a dialog or other notification requesting user input or other input to select the appropriate grammar or window which the corresponds to the speech event or directive or other event.

In other embodiments, the system selects one grammar to use as a focus grammar against which speech events and other directives or events will be processed, and deactivates other grammars. Thus, there is no confusion processing speech events and other directives or events that are contained in multiple active grammars. All of the grammars associated with open windows or frames generally remain persistent in memory, but only one grammar has the focus at any time.

For example, in some embodiments, the system selects the grammar associated with the last window or frame loaded by the browser 115. In other embodiments, the system selects the grammar associated with the active browser 115 window. For example, in the Microsoft Windows operating system and other operating systems with a graphical user interface, multiple windows may be open at the same time, but these windows are generally presented as layers or otherwise cascaded with the top window being the active window. In other embodiments, the system may require that frames do not contain duplicate speech events or directives or other events.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

APPENDIX A

CONNECTION DATA STRUCTURE
>From SMLApp.java: The main module that handles thread management
    //* ConnectionListManager.
    //* Collections provide binary search. This provides a hashtable lookup which believe will be faster.
    //* Add/rem are a bit slower, but only one add/rem per set of voice pages. One lookup per page
    //* Hashtables also makes explicit what our searches will be on (what our keys are).
   static class ConnectionListManager {                    //* Akin to a java "factory". But the impl is

```
explicitly provided in the declr.
                static class Connection {
                        Socket sockS;
                        OutputStream osO;
                        InputStream isI; //* Necessary?
                        String sGrammar;
                        boolean bPrevMsgGram = false;
                }
                static Hashtable hGrammar       = new Hashtable( );         //* Grammar is the key
                static Hashtable hSock = new Hashtable( );          //* Socket is the key.
                static LinkedList l1Connections = new LinkedList( );
                synchronized static void Add(Connection C) throws ConnectionException {
                        Dbg.println("SMLApp", Dbg.CONN, "Add", "Connection: " + C +". C.sGrammar: " +
C.sGrammar + ".C.sockS: " + C.sockS);
                        l1Connections.add(C);
                        if( (C.sGrammar == null) || (C.sockS == null) ) throw new ConnectionException("Null Grammar
or Socket");
                        hGrammar.put(C.sGrammar, new Integer(l1Connections.indexOf(C)));
                        hSock.put(C.sockS, new Integer(l1Connections.indexOf(C)));
                }
                synchronized static void Update(Connection C, String sGrammar) throws ConnectionException {
                        Dbg.println("SMLApp", Dbg.CONN, "Update", "Connection: " + C +". C.sGrammar: " +
C.sGrammar + ".sGrammar: "+ sGrammar + ". C.sockS: " + C.sockS);
                        if( (sGrammar == null) || (C.sGrammar == null) ) throw new ConnectionException("Null
Grammar");
                        if( l1Connections.indexOf(C) < 0) throw new ConnectionException("Invalid Connection");
                        hGrammar.remove(C.sGrammar);
                        C.sGrammar = sGrammar;
                        hGrammar.put(C.sGrammar, new Integer(l1Connections.indexOf(C)));
                }
                synchronized static void Rem(Socket sockS) {
                        Connection C = Lookup(sockS);
                        Rem(C);
                }
                synchronized static void Rem(Connection C) {
                        Dbg.println("SMLApp", Dbg.CONN, "Rem", "Connection: " + C +". C.sGrammar: " +
C.sGrammar + ". C.sockS: " + C.sockS);
                        l1Connections.remove(C);
                        RecomputeHashTables( );
                }
                static void RecomputeHashTables( ) {
                        hGrammar.clear( );
                        hSock.clear( );
                        Connection C = (Connection) l1Connections.getFirst( );
                        if (C == null) return;
                        int iIndex = 0;
                        hGrammar.put(C.sGrammar, new Integer(iIndex));
                        hSock.put(C.sockS, new Integer(iIndex)); iIndex++;
                        while (iIndex < l1Connections.size( )){
                                C = (Connection) l1Connections.get(iIndex);
                                hGrammar.put(C.sGrammar, new Integer(iIndex));
                                hSock.put(C.sockS, new Integer(iIndex));
                                iIndex++;
                        }
                }
                synchronized static Connection Lookup(String sGrammar) {
                        int iIndex = −1;
                        try {
                                Dbg.println("SMLApp", Dbg.CONN, "Lookup", "sGrammar: " + sGrammar);
                                Object oTmp = hGrammar.get(sGrammar);
                                if (oTmp == null) return null;
                                iIndex = ((Integer) oTmp).intValue( );
                                return (Connection) l1Connections.get(iIndex);
                        }
                        catch(IndexOutOfBoundsException e) {
                                Dbg.println("SMLApp", Dbg.ERR, "Lookup(sGrammar)",
                                                "IndexOutOfBoundsException: iIndex" + iIndex + ".sGrammar: " +
sGrammar);
                                return null;
                        }
                }
                synchronized static Connection Lookup(Socket sockS) {
                        int iIndex = −1;
                        try {
                                Dbg.println("SMLApp", Dbg.CONN, "Lookup", "sockS" + sockS);
                                Object oTmp = hSock.get(sockS);
                                if(oTmp == null) return null;
                                iIndex = ((Integer) oTmp).intValue( );
                                return (Connection) l1Connections.get(iIndex);
```

```
                    }
                    catch(IndexOutOfBoundsException e) {
                            Dbg.println("SMLApp", Dbg.ERR, "ConnectionListManager:Lookup(sockS)",
                                    "IndexOutOfBoundsException: iIndex" + iIndex + ".sockS: " +
sockS);
                            return null;
                            }
                    }
            }
        public static class ConnectionException extends Exception {
            public ConnectionException(String msg) {
                            super(msg);
                                    Dbg.println("SMLApp", Dbg.ERR, "ConnectionException", msg);
                            } }
    static ConnectionListManager CLM;
            static ConnectionListManager.Connection connGDisplay = null;    //* Connection based on
gDisplay grammar lookup.
================================================================================
========================================================
GRAMMAR DATA STRUCTURE
>From SpeechIO.java:
            public class Rule {
            String sTag = null;
            String sJSGF = null;
            String sJSML = null;
            String sURL = null;           //* URL to call when this rule triggered
            String sURLSep = null;
            String sURLExt = null;
            int    iSpeakJSGF = 0; //* Create speakable phrase from (depth – (iSpeakJSGF-1)) level JSGF.
            }
            public class EGBlock {    //* Embedded Grammar JSGF rules
            int iNumRules = 0;        //* Number of rules in this block
            Rule arRule[ ] new Rule[iMaxNumRule]; //* Linked list later . . .
            String sJSML = null;
            String sGrammar;
            String sEntryPhrase = null;
            boolean bDefaultSpeak = true;          //* Speak the JSML in this block w/o prompting.
                                                   //* false if jsgf present in this block.
            public class EGBlockSet {
                    int iIncReal;
                    String sGrammar;
                    EGBlock[ ] aEGBlock;
            }
            static Hashtable hGrammar       = new Hashtable( );          //* Grammar is the key
            static LinkedList l1EGBlockSets = new LinkedList( );
            synchronized static void Add(EGBlockSet EGBS) throws SpeechIOException {
                    Dbg.println("SpeechIO", Dbg.GRAMMAR, "Add", "EGBlockSet: " + EGBS +". EGBS.sGrammar: " +
EGBS.sGrammar);
                    l1EGBlockSets.add(EGBS);
                    if(EGBS.sGrammar == null) throw new SpeechIOException("Null Grammar");
                    hGrammar.put(EGBS.sGrammar, new Integer(l1EGBlockSets.indexOf(EGBS)));
                    }
            synchronized static void Rem(String sGrammar) {
                    EGBlockSet EGBS = Lookup(sGrammar);
                    Rem(EGBS);
                    }
            synchronized static void Rem(EGBlockSet EGBS) {
                    Dbg.println("SpeechIO", Dbg.GRAMMAR, "Rem", "EGBlockSet: " + EGBS +". EGBS.sGrammar: " +
EGBS.sGrammar);
                    l1EGBlockSets.remove(EGBS);
                    RecomputeHashTables( );
                    }
        static void RecomputeHashTables( ) {
            try {
            hGrammar.clear( );
            EGBlockSet EGBS = (EGBlockSet) l1EGBlockSets.getFirst( );
            if(EGBS == null) return;
            int iIndex = 0;
            hGrammar.put(EGBS.sGrammar, new Integer(iIndex));
            iIndex++;
            while (iIndex < l1EGBlockSets.size( )){
                    EGBS = (EGBlockSet) l1EGBlockSets.get(iIndex);
                    hGrammar.put(EGBS.sGrammar, new Integer(iIndex));
                    iIndex++;
            }
            } catch (java.util.NoSuchElementException E) { }
        }
            synchronized static EGBlockSet[ ] toArray( ) {
            EGBlockSet[ ] aEGBS = new EGBlockSet[1];
```

```
            aEGBS = (EGBlockSet[ ]) l1EGBlockSets.toArray(aEGBS);
            return aEGBS;
        }
        synchronized static EGBlockSet Lookup(String sGrammar) {
            int iIndex = −1;
            try {
                Dbg.println("SpeechIO", Dbg.GRAMMAR, "Lookup", "sGrammar: "+ sGrammar);
                Object oTmp = hGrammar.get(sGrammar);
                if(oTmp == null) return null;
                iIndex = ((Integer) oTmp).intValue( );
                return (EGBlockSet) l1EGBlockSets.get(iIndex);
            }
            catch(IndexOutOfBoundsException e) {
                Dbg.println("SpeechIO", Dbg.ERR, "Lookup(sGrammar)",
                            "IndexOutOfBoundsException: iIndex" + iIndex + ". sGrammar: " +
sGrammar);
                return null;
            }
        }
        public static class SpeechIOException extends Exception {
            public SpeechIOException(String msg) {
                super(msg);
                Dbg.println("SpeechIO", Dbg.ERR, "SpeechIOException", msg);
            } }
```

What is claimed is:

1. A method for processing a voice request for data specifying a web page, the request including at least a portion of, and invoking, a rule-based grammar statement, the method comprising:
responsive to the voice request:
identifying which one of a plurality of grammars is associated with the rule-based grammar statement;
determining whether a first connection identified as being associated with the grammar is specified in a data structure identifying a plurality of connections and, for each of the plurality of connections, a respective grammar and a respective window in which a web page is presentable, wherein each of the identified grammars is processable by a processor to interpret a received voice request; and
if the first connection is specified in the data structure, interpreting the request using the identified grammar, to request the specified webpage and display the specified webpage in at least a portion of the window associated with the first connection.

2. The method of claim 1, wherein the rule-based grammar statement includes a phrase portion, a command portion, and a tag portion.

3. The method of claim 1, the method further comprising processing the request in at least a portion of a new window capable of presenting the specified web page and associated with a second connection if the first connection identified as being associated with the grammar is not specified in the data structure.

4. The method of claim 3, the method further comprising adding the second connection to the data structure and associating the second connection with the grammar if the second connection is not specified in the data structure.

5. The method of claim 3, the method further comprising associating the new window with a connection if the data structure does not specify any connection associated with the grammar.

6. The method of claim 5, wherein the new window comprises a window selected according to a user preference.

7. The method of claim 5, wherein the new window comprises a last window loaded by a computing device associated with the second connection.

8. The method of claim 5, wherein the new window comprises an active window at a computing device associated with the second connection.

9. The method of claim 1, wherein identifying a grammar comprises identifying a grammar according to a user preference.

10. The method of claim 1, wherein identifying a grammar comprises identifying a grammar associated with a last window loaded by a computing device associated with a connection.

11. The method of claim 1, wherein identifying a grammar comprises identifying a grammar associated with an active window at a computing device associated with a connection.

12. The method of claim 1, wherein the window comprises a browser window.

13. The method of claim 1, wherein at least a portion of the window comprises a frame.

14. The method of claim 1, wherein the request comprises a request for complex data.

15. The method of claim 14, wherein the request comprises a request for complex data embedded in a web page.

16. The method of claim 14, the method further comprising examining a header or a footer associated with the request to determine a type of data requested.

17. The method of claim 16, wherein examining a header or a footer comprises examining a header or a footer specifying a mime type to determine a type of data requested.

18. The method of claim 14, the method further comprising examining a filename or a file extension associated with the request to determine a type of data requested.

19. The method of claim 1, the method further comprising removing identification of a connection from the data structure if a window associated with that connection is closed.

20. The method of claim 1, wherein each of the plurality of grammars is associable with a respective plurality of ruled-based grammar statements.

21. The method of claim 1, wherein, for each of the grammars specified in the data structure, a respective page mark-up is received, the page mark-up including both first components parsed into a respective visual web page and second components parsed into the respective grammar and not contributing to generation of the respective visual web page, the respective grammar being generated irrespective of content of the first components and being loaded into memory in association with the respective visual web page.

22. The method of claim 1, wherein the request for the specified webpage is made to a web server.

23. A system for processing a voice request for data specifying a web page, the request including at least a portion of, and invoking, a rule-based grammar statement, the system comprising:
means for, responsive to the voice request:
identifying which one of a plurality of grammars is associated with the rule-based grammar statement;
determining whether a first connection identified as being associated with the grammar is specified in a data structure identifying a plurality of connections and, for each of the plurality of connections, a respective grammar and a respective window in which a web page is presentable, wherein each of the identified grammars is processable by a processor to interpret a received voice request; and
if the first connection is specified in the data structure, interpreting the request using the identified grammar, to request the specified webpage and display the specified webpage in at least a portion of the window associated with the first connection.

24. The system of claim 23, wherein the rule-based grammar statement comprises a phrase portion, a command portion, and a tag portion.

25. The system of claim 23, the system further comprising means for processing the request in at least a portion of a new window capable of presenting the specified web page and associated with a second connection if the first connection identified as being associated with the grammar is not specified in the data structure.

26. The system of claim 25, the system further comprising means for adding the second connection to the data structure and associating the second connection with the grammar if the second connection is not specified in the data structure.

27. The system of claim 25, the system further comprising means for associating the new window with the connection if the connection is not specified in the data structure.

28. The system of claim 23, wherein the request for data specifying a web page comprises a request for complex data.

29. The system of claim 23, wherein the request for the specified webpage is made to a web server.

30. A non-transitory computer usable medium or media storing program code which, when executed on one or more computerized devices, causes the one or more computerized devices to execute a method for processing a voice request for data specifying a web page, the request including at least a portion of, and invoking, a rule-based grammar statement, the method comprising:
responsive to the voice request:
identifying which one of a plurality of grammars is associated with the rule-based grammar statement;
determining whether a first connection identified as being associated with the grammar is specified in a data structure identifying a plurality of connections and, for each of the plurality of connections, a respective grammar and a respective window in which a web page is presentable, wherein each of the identified grammars is processable by a processor to interpret a received voice request; and
if the first connection is specified in the data structure, interpreting the request using the identified grammar, to request the specified webpage display the specified webpage in at least a portion of the window associated with the first connection.

31. The non-transitory computer usable medium or media of claim 30, wherein the rule-based grammar statement comprises a phrase portion, a command portion, and a tag portion.

32. The non-transitory computer usable medium or media of claim 30, the method further comprising processing the request in at least a portion of a new window capable of presenting the specified web page and associated with a second connection if the first connection identified as being associated with the grammar is not specified in the data structure.

33. The non-transitory computer usable medium or media of claim 32, the method further comprising adding the second connection to the data structure and associating the second connection with the grammar if the second connection is not specified in the data structure.

34. The non-transitory computer usable medium or media of claim 32, the method further comprising associating the new window with the connection if the connection is not specified in the data structure.

35. The non-transitory computer usable medium or media of claim 30, wherein the request for data specifying a web page comprises a request for complex data.

36. The non-transitory computer usable medium or media of claim 30, wherein the request for the specified webpage is made to a web server.

37. A method for processing a voice request for data specifying a first web page and invoking a rule-based grammar statement, the voice request including a phrase, the method comprising:
prior to receiving the voice request, receiving data including first data specifying a second web page for display and second data defining the rule-based grammar statement, the first and second data being associated with a connection between a speech-related data processing module and a web browser;
responsive to the voice request, determining whether the connection is specified in a data structure identifying one or more connections;
selecting a grammar associated with the connection from a data structure identifying one or more grammars; and
processing the rule-based grammar statement using the selected grammar in at least a portion of a first window capable of presenting the first web page and associated with the connection if the connection is specified in the data structure identifying one or more connections, the processing including, in response to the phrase, executing a command (a) for navigating from the second web page to the specified first web page and (b) referenced by the rule-based grammar statement, text of the phrase being different than text of each of all visual links in the second web page.

38. The method of claim 37, the method further comprising selecting a new grammar associated with the connection from a data structure specifying one or more grammars and processing the rule-based grammar statement using the selected grammar in at least a portion of a new window associated with the connection if the connection is not specified in the data structure specifying one or more connections.

39. The method of claim 38, the method further comprising adding the connection to the data structure specifying one or more connections and associating the connection with the new grammar in the data structure specifying one or more grammars.

40. The method of claim 37, wherein:
the received data defines the rule-based grammar statement as including a phrase portion, a command portion, and a tag portion;

the phrase of the voice request corresponds to at least a portion of the phrase portion; and the command portion references the executed command.

41. The method of claim 37, wherein the second web page does not include any visual link to the first web page.

42. A system for processing a voice request for data specifying a web page, the voice request including at least a portion of, and invoking, a rule-based grammar statement, the system comprising at least one processor configured to process the voice request by:

identifying a grammar associated with the rule-based grammar statement;

determining whether a connection is associated with the identified grammar;

if the grammar is determined to be a connection associated grammar:

accessing a data structure identifying a plurality of connections to find a first connection which the data structure specifies is associated with the grammar, wherein the data structure identifies respective grammars associated with the plurality of connections, and each of the identified grammars is processable by a processor to interpret a received voice request; and interpreting the voice request using the grammar identified as being associated with the rule-based grammar statement to request the web page and present the web page in at least a portion of a window capable of presenting the web page and associated with the first connection; and otherwise interpreting the voice request using the grammar identified as being associated with the rule-based grammar statement to request the web page from a web server and present the web page in at least a portion of a new window capable of presenting the web page and associated with a second connection.

43. The system of claim 42, wherein the processing of the voice request further comprises:

if the grammar is not determined to be a connection associated grammar, adding the second connection to the data structure and associating the second connection with a new grammar.

44. The system of claim 42, wherein the processing of the voice request further comprises, if the grammar is not determined to be a connection associated grammar, modifying the data structure to include an association of the new window or the portion of the new window with the second connection.

45. The system of claim 42, wherein the system:

receives a page mark-up that includes both first components parsed into a visual web page and second components parsed into the identified grammar and not contributing to generation of the visual web page, the grammar being generated irrespective of content of the first components; and loads the grammar into memory in association with the visual web page.

46. The system of claim 42, wherein the request for the specified webpage is made to a web server.

47. A computer-implemented method for providing web pages, comprising:

receiving a first data, the first data including a first web page and a first grammar based on which a voice command is parseable, wherein the first grammar is associated with the first web page;

responsive to the receipt of the first data:

displaying in a first display window at least a portion of the first web page;

storing a reference to the first grammar in a data structure that associates the first grammar with the first display window;

responsive to receipt of second data associated with a second web page:

displaying in a second display window at least a portion of the second web page in accordance with the second data; and for a second grammar, based on which a voice command is parseable, and that is obtained via the receipt of the second data, storing a reference to the second grammar in the data structure, the data structure associating the second grammar with the second display window; and responsive to an input voice command:

determining with which of the first and second grammars the voice command accords;

parsing the input voice command according to the determined one of the first and second grammars;

accessing the data structure to determine with which of the first and second display windows the determined one of the first and second grammars is associated; and displaying a new data in the determined one of the first and second display windows.

48. The method of claim 47, wherein the method further comprises:

for each of the first and second display windows, opening a respective one of a first and a second connection with a web browser, wherein the data displayed in the first and second display windows is provided to the web browser for generating the display over the first and second connections, respectively.

49. The method of claim 48, wherein the first and second connections are persistent connections, and at least one of (a) are closed in response to a closing of a respective one of the first and second display windows, and (b) are closed in response to a loading into the respective one of the first and second display windows of a different web page not associated with a grammar.

50. The method of claim 49, wherein the method further comprises:

responsive to the closing, deleting from the data structure the respective one of the first and second grammars.

51. The method of claim 50, wherein the data displayed in the determined one of the first and second display windows is a subset of data received in response to a request for a third web page, the request transmitted in response to the voice command, and the data received in response to the data request includes a third grammar, the method further comprising:

updating the data structure to include a reference to the third grammar in association with the determined one of the first and second display windows.

52. The method of claim 47, wherein each of the first and second grammars defines rule based grammar structures, each of the rule based grammar structures including a phrase portion, a command portion, and a tag portion.

53. The method of claim 47, wherein the method further comprises:

responsive to another voice command:

determining that the another voice command is equally associable with the first and second grammars;

selecting one of the first and second display windows; and displaying data in the selected one of the first and second display windows.

54. The method of claim 53, wherein the selecting is in accordance with a user input.

55. The method of claim 53, wherein whichever of the first and second display windows was last loaded is selected in the selecting step.

56. The method of claim 53, wherein whichever of the first and second display windows is currently active is selected in the selecting step.

57. The method of claim 47, wherein the method further comprises:
responsive to a command, determining which of (a) a request for a new web page and (b) a request for embedded data of a current web page the command includes;
if it is determined that the command includes the request for the embedded data, transmitting the request to a web server; and otherwise
determining whether the command is a voice command.

58. The method of claim 57, wherein the determination of which of the request for the new page and the request for the embedded data the command includes is performed by examining one of a header and a footer associated with the command.

59. The method of claim 58, wherein the examining includes examining a specification, in the one of the header and the footer, of a mime type.

60. The method of claim 57, wherein the determination of which of the request for the new page and the request for the embedded data the command includes is performed by examining one of a file name and a file extension associated with the command.

61. The method of claim 47, wherein:
the first web page is a visual web page;
the first data includes a first page-markup that includes both first components parseable into the first visual web page and second components parseable into the first grammar irrespective of content of the first components, the second components being specified by a speech markup language and not used for generating the first visual web page; and
the second data includes a second page-markup that includes both first components parseable into the second visual web page and second components parseable into the second grammar irrespective of content of the first components of the second page-markup, the second components of the second page-markup being specified by a speech markup language and not used for generating the second visual web page.

62. The method of claim 47, wherein, in the accessing step, the determined one of the first and second display windows is not in focus and the other of the first and second display windows is in focus.

63. A method for processing a voice request for data specifying a web page, the request including at least a portion of, and invoking, a rule-based grammar statement, the method comprising:
responsive to the voice request:
identifying which one of a plurality of grammars is associated with the rule-based grammar statement;
determining whether a first connection identified as being associated with the grammar is specified in a data structure identifying a plurality of connections and, for each of the plurality of connections, a respective grammar and a respective window in which a web page is presentable; and
if the first connection is specified in the data structure, processing the request using the identified grammar, to display the specified webpage in at least a portion of the window associated with the first connection;
wherein the request includes a command (a) to be run, responsive to the request, in the window associated with the first connection and (b) that is independent of all commands previously run in any of the windows identified in the data structure.

\* \* \* \* \*